Jan. 17, 1956 L. G. ECKMANN ET AL 2,731,554
PRIVATE AUTOMATIC EXCHANGE LINE ADAPTER
FOR MOBILE RADIO SYSTEM
Filed Aug. 28, 1952
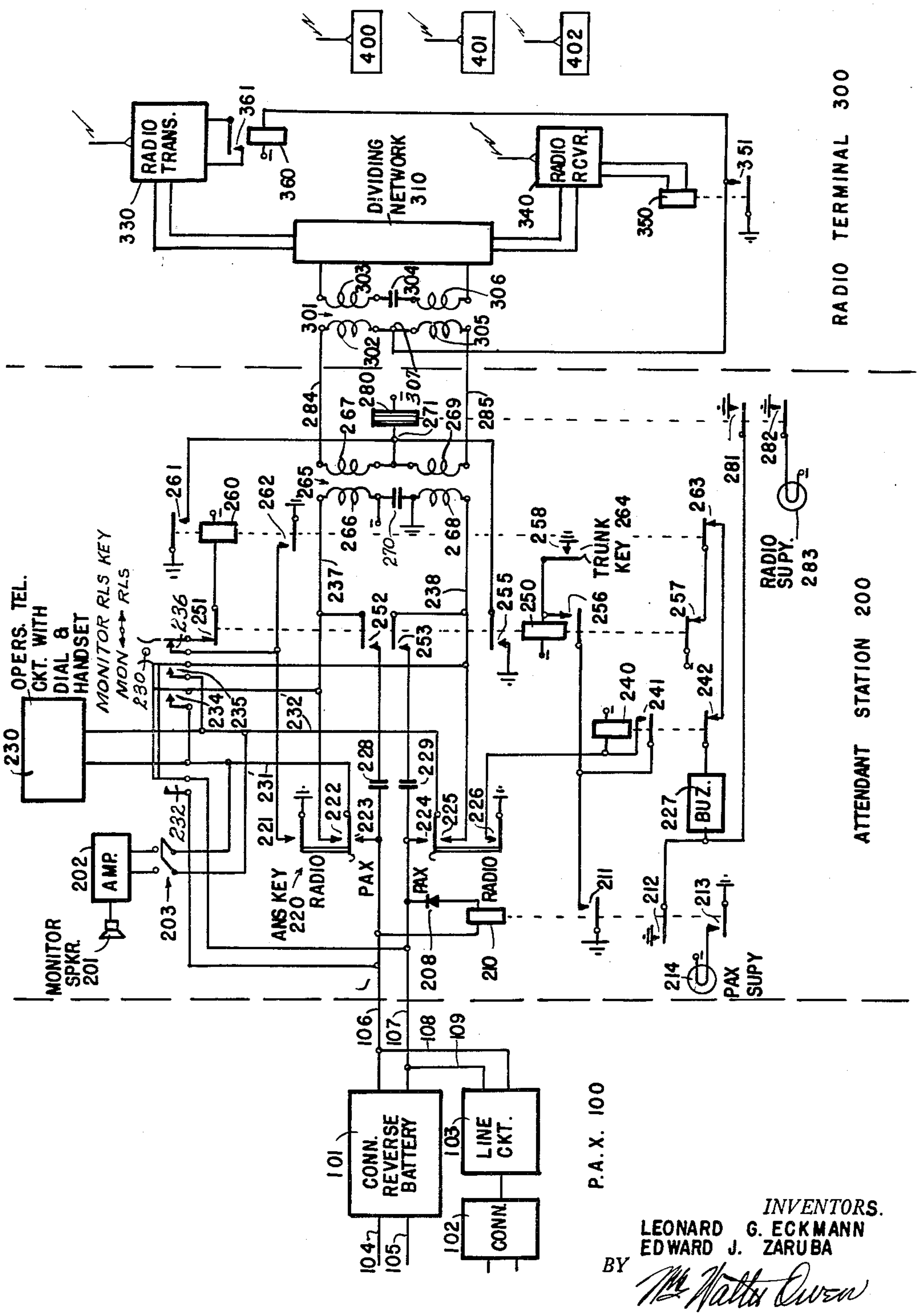
INVENTORS.
LEONARD G. ECKMANN
EDWARD J. ZARUBA
BY [signature]
ATTY.

United States Patent Office 2,731,554
Patented Jan. 17, 1956

2,731,554

PRIVATE AUTOMATIC EXCHANGE LINE ADAPTER FOR MOBILE RADIO SYSTEM

Leonard G. Eckmann, Berkeley, and Edward J. Zaruba, Villa Park, Ill., assignors to Automatic Electric Laboratories, Inc., Chicago, Ill., a corporation of Delaware Application August 28, 1952, Serial No. 306,816
10 Claims. (Cl. 250—6)

The present invention relates to the communication arts in general, and more particularly to a radio telephone system comprising a number of private automatic exchange stations and a number of mobile units whereby the subscribers located thereat, through the medium of a central station possessing the main transmitter and receiver, may establish contact with each other and converse with each other over the facilities furnished by said linking central station.

The principal object of the invention is to provide a radio telephone system which makes it possible for a private automatic exchange subscriber to communicate through a link station, equipped with special facilities, with a mobile station over a single pair of radio frequency channels serving all the mobile stations, one of the channels being used for transmitting and the other channel being used for receiving.

Another object of the invention is to provide a radio telephone system which makes it possible for a radio mobile subscriber to make a call to either another mobile station subscriber or to a private automatic exchange (P. A. X) station subscriber by way of the link or attendant station having an operator thereat to supervise the calls.

A more detailed object of the invention concerns itself with the methods used for signalling the operator at the link station to indicate an incoming call whether from a P. A. X subscriber or a radio mobile subscriber.

Another object concerns itself with methods employed for monitoring, at the will of the station operator, any conversation between the various subscribers and also means whereby the operator can converse privately with either a P. A. X station subscriber or the mobile subscribers.

Another object deals with a circuit which is controlled by the P. A. X subscriber to automatically shut off the station transmitter and signal the operator when the call has been terminated, the control being exercised by replacing the handset.

A further object is to provide a circuit arrangement together with associated components which are activated upon receipt of a carrier wave transmitted by a transmitter from any calling mobile station, which carrier wave automatically turns on the station transmitter to rebroadcast the calling mobile subscriber's signal to the called subscriber's mobile station.

Another object is to provide means controlled by the operator to lock the station transmitter on the air during a call between two mobile station subscribers and to busy the P. A. X line connecting the private automatic exchange to the attendant station to advise a calling P. A. X subscriber that the P. A. X-to-mobile subscriber link is not at that time available to him.

The invention, both as to its organization and method of operation together with further objects and advantages thereof, will best be understood by reference to the specification taken in connection with the accompanying drawing.

The drawing is subdivided by broken lines into three sections representing the private automatic exchange, P. A. X 100, the attendant station 200, and the radio terminal 300, together with radio mobile stations 400–402. The radio terminal 300 may be located at or near the attendant station 200, or it may be situated at some remote position which is most advantageous for radio wave transmission and reception and connected by a line with the attendant station 200.

The private automatic exchange shown in simplified manner as P. A. X 100 consists of a connector 101 which will connect incoming calls from a plurality of exchange subscribers over the lines 104 and 105 through the connector 101 to the P. A. X line comprising conductors 106 and 107 which lead into the attendant station 200. Outgoing calls from the attendant station 200 go over conductors 108 and 109 through the line circuit 103 and then through a rotary line switch, not shown, and a final switch such as the connector switch 102, to the line of the called subscriber station. Whenever a call comes in from the P. A. X 100 into the attendant station 200, two methods are used for signalling the operator thereat, namely the P. A. X supervisory lamp 214 and the buzzer 227. In response to the call the operator at the attendant station 200 operates the ANS Key 220 to the P. A. X position. This closes the contacts 226 which complete an operating circuit to relay 240 thereby opening the circuit to buzzer 227 when contacts 242 open up and connects the operator telephone circuit 230 to the P. A. X line by closure of contacts 223 and 224. The P. A. X supervisory lamp 214 remains lit for the duration of the call. The ANS Key 220 is also used for connecting the operator to the radio trunk 237 and 238 whenever an incoming call originates at any one of the radio mobile stations. Monitor speaker 201 is additional equipment which can be used if desired. Switch 203 connects the monitor amplifier 202 to the operator telephone circuit 230. The Monitor-RLS Key 231 as shown on the drawing is in the normal position. This is a three-position key in which the MON position is a locking position and the RLS position is a non-locking position. When the key is put to MON position, contacts 232, 234 and 235 will be closed. Contacts 236 will continue to be closed. When the switch is momentarily put in the RLS position, the only contacts that will open up will be 236, contacts 232, 234 and 235 continuing to remain open. The purpose of the Trunk Key 264, a non-locking key, is to energize relay 250 which will close the circuit between the P. A. X line 106 and 107 and the radio trunk 237 and 238. Contacts 255 on relay 250 are used to effect a permanent ground for the simplex leg of the radio trunk 284 and 285 so as to lock permanently the radio transmitter 330 on air when relay 360 locks because of the effected ground. The Radio supervisory lamp 283 is used to signal the operator at the attendant station 200 of an incoming call from any one of the radio mobile stations. This light remains illuminated during the period of the initiated call. Dividing network 310 is used to connect the radio receiver 340 and the transmitter 330 to the radio trunk 237 and 238. The repeating coils 265 and 301 furnish a simplex control circuit for the transmitter 330.

A call may be initiated by a P. A. X subscriber station over the lines 104 and 105 through the P. A. X 100 over the line 106 and 107 which signals the operator at the attendant station 200 by means of the P. A. X supervisory lamp 214 and the buzzer 227. The operator moves the ANS Key 220 to the P. A. X position and receives the calling subscriber's instructions. After determining what radio mobile station the calling subscriber is desirous of contacting, the operator moves the ANS Key 220 to the Radio position thereby energizing relay 260 when contacts 221 close. Relay 280 operates because of the ground connection made at the make contacts 261 of relay 260. This also results in operation of relay 360 which turns on the radio transmitter 330. The operator then speaks into the handset located at the operator's telephone circuit 230 and calls the desired radio mobile unit. When the called subscriber at the radio mobile unit responds, the operator operates momentarily the Trunk Key 264 which energizes relay 250 thereby connecting the calling subscriber on the line 106 and 107 to the radio trunk 237 and 238.

Thereafter the operator disconnects the operator telephone circuit 230 from the radio trunk 237 and 238 by operating the ANS Key 220 to the normal position. After the conversation has been terminated and the calling subscriber hangs up, the battery is reversed on line 106 and 107 in a manner to be hereinafter explained which causes relay 210 to release because of the inability of the reversed current to flow backward through the rectifier 208. Relay 250 releases and opens a circuit to relay 360 which in turn shuts down the radio transmitter 330.

Whenever a subscriber at the mobile station wants to make a call to a P. A. X subscriber, the mobile station subscriber turns on the radio transmitter located at the mobile station which transmits a carrier wave signal which is picked up by the radio receiver 340 located at the radio terminal 300 and connected to the attendant station 200. Relay 350, radio squelch relay, closes a ground connection to relay 360 which energizes the radio transmitter 330 and also closes a circuit to relay 280 which turns on the Radio supervisory lamp 283 and the buzzer 227, thus signalling the operator. The operator connects the operator telephone circuit 230 to the radio trunk 237 and 238 by moving the ANS Key 220 to the Radio position and requests the number of the P. A. X subscriber desired by the mobile subscriber. Having received the directory number of the desired P. A. X party to be called, the operator turns the ANS Key 220 to P. A. X position and dials the number from the operator position 230 over the line 108 and 109 into the line circuit 103 and its associated connector switch 102 located at P. A. X 100. After the P. A. X subscriber has answered, the operator momentarily closes the Trunk Key 264 which results in the connection of the radio trunk 237 and 238 to the P. A. X line 106 and 107. Thereafter the operator moves the ANS Key 220 to normal position and retires to other duties. With respect to the operator's telephone circuit the method of release after the conversation has been terminated is identical to the one described previously in a call from the P. A. X subscriber to one of the mobile station subscribers.

Whenever a subscriber at one of the mobile stations wants to initiate a call to another mobile station subscriber, the calling subscriber turns on the radio transmitter located at the mobile station which transmits a carrier wave signal to the radio terminal 300 where it is picked up by the radio receiver 340. This results in operation of the radio squelch relay 350, as previously described, which is effective to turn on the radio transmitter 330 and also to signal the operator at the attendant station 200 by means of the Radio supervisory lamp 283 and the buzzer 227. The operator responds by operating the ANS Key 220 to the Radio position which by means of its contacts 221 completes a circuit for relay 260 which thereafter closes its lock circuit by means of contacts 262. Operation of the relay 260 also opens the buzzer circuit by means of the contacts 263. Contacts 261 close and establish a locking circuit for relay 360 which in turn locks the operating circuit of the radio transmitter 330. Operation of the ANS Key to the Radio position also enables the operator to hear that the call is mobile-to-mobile subscriber and thereupon returns the ANS Key to its Normal position. Thereafter the speech signal received by the radio receiver 340 from the calling mobile subscriber is passed to the dividing network 310 and into the radio transmitter 330 where it modulates said radio transmitter to send out a signal on a different frequency over the airwaves to the called radio mobile subscriber. To advise any calling P. A. X subscriber that the radio channel is not at this time available to him, the operator, after monitoring and establishing that a conversation has been initiated between the mobile stations, operates the Monitor-RLS Key 231 to the Monitor position which causes contacts 232 to close and place a short across the lines 106 and 107 thereby busying the P. A. X line. The operator monitors the call by means of a handset connected to the operator telephone circuit 230 or by means of additional equipment, such as monitor speaker 201. After the call has been terminated the operator operates momentarily the Monitor-RLS Key 231 to RLS position thus releasing relay 260 by opening its circuit at the contacts 236 at the same time removing the short from the P. A. X line. Thereafter the radio transmitter 330 is shut off and the Radio supervisory lamp 283 is extinguished.

OPERATION

*Calls from P. A. X to mobile radio*

When the circuit is seized by one of the P. A. X connectors, battery and ground from the line switch is removed and the connector switch 101 located at P. A. X 100 switches through and direct current of opposite polarity flows from the connector 101, over the line 107, through the rectifier 208, through the winding of relay 210, and over the line 106 back to the connector 101. Relay 210 operates and performs the following operations: make contacts 211 close and prepare a locking circuit for relays 240 and 250; make contacts 212 close and operate the buzzer 227 from ground through the make contacts 212, through the buzzer 227, through the break contacts 242 on relay 240, through the break contacts 263 on relay 260, and through the break contacts 257 on relay 250 to the battery; and make contacts 213 close a circuit for the P. A. X supervisory lamp 214 causing it to light up and thereby notify the attendant situated at the attendant's station 200 of an incoming call. The attendant responds by operating the ANS Key 220 to the P. A. X position, causing the operation of relay 240 when contacts 226 close and complete a circuit from ground to the battery through the aforementioned relay. Make contacts 223 and 224 connect the P. A. X lines 106 and 107, respectively, to the attendant's telephone situated at the operator's telephone circuit 230 by means of the lines 231′ and 232′. Relay 240 operates and locks itself over the following circuit: battery through the winding of relay 240, over the make contacts 241, and over the make contacts 211 on relay 210 to ground. The break contacts 242 open the buzzer circuit thereby silencing the buzzer 227. After the calling subscriber gives a request to the attendant to call a certain mobile unit, the attendant operates the ANS Key 220 to the Radio position, thereby energizing relay 260 and transferring the attendant's telephone to the radio trunk comprising lines 237 and 238. The make contacts 222 and 225 connect the operator's telephone circuit 230 to the radio trunk 237 and 238, respectively. A current path to the operator telephone circuit 230 is provided from battery through the upper winding 266 of repeating coil 265, over the line 237, through the make contacts 222, over the line 231′ through the operator telephone circuit at 230, back over the line 232′ and the make contacts 225, over the line 238, and through the lower winding 268 of the repeating coil 265 to ground. The purpose of the condenser 270 is to preserve the aforementioned D. C. circuit and to allow voice currents to be transmitted through the repeating coil 265.

Relay 260 operates when current flows over the path extending from battery through the winding of relay 260, through break contacts 251 of relay 250, through the break contacts 236 of the Monitor-RLS Key 231, and through the make contacts 221 of the ANS Key 220 to ground. A locking circuit for relay 260 is established from ground through the make contacts 262 of relay 260, through the break contacts 236 of Monitor-RLS Key 231, through the break contacts 251 of relay 250, and through the winding of relay 260 to battery. Make contacts 261 close and ground the simplex leg of the repeating coil 265 at the point 271, thereby turning on the radio transmitter 330 in the manner following. The radio transmitter energizing relay 360 is operated when current flows over the path extending from battery through the winding of relay 360 to the center tap 307 of the repeating coil 301, through both of the windings 302 and 305 to the other two windings 267 and 269 of the repeating coil 265, through the center tap 271, and through the make contacts 261 of relay 260 to ground. Relay 280 which is connected to the center tap 271 also may be energized over the contacts 261 to ground. Make contacts 281 close and establish a multiple ground to the incomplete circuit of the buzzer 227. Make contacts 282 close and complete a circuit to the Radio supervisory lamp 283 causing it to light up and indicate to the operator that the radio transmitter 330 is energized.

The attendant or the operator calls the required radio mobile unit, for example radio mobile unit 400, by speaking into the telephone connected to the operator's telephone circuit 230 and thereby modulating the carrier wave transmitted over the air by the radio transmitter 330. After establishing contact the operator connects the P. A. X line to the radio trunk and transfers control of the transmitter energizing circuit from the operator to the calling subscriber in the manner following. The operator momentarily operates the non-locking Trunk Key 264 which at the contacts 258 provides a path to ground from battery through the winding of the relay 250 causing relay 250 to become energized. Make contacts 252 and 253 close and connect the radio trunks 237 and 238, respectively, to the P. A. X lines 106 and 107 through the condensers 228 and 229, respectively. The purpose of the aforementioned condensers is to isolate the battery supply connected to the windings 266 and 268 of the repeating coil 265 from the battery supply furnished from the connector switch 101 over the lines 106 and 107. The control transfer operation is accomplished when the operation of relay 250 assumes control of the circuits previously controlled by the operation of relay 260 which is de-energized when the contacts 251 of relay 250 are opened. De-energization of the relay 260 opens its own locking circuit at its contacts 262, opens the path to ground of the transmitter energizing relay 360 at the contacts 261 and re-closes the contacts 263 of the buzzer circuit. Uninterrupted operation of the transmitter energizing relay 360 is insured by simultaneously providing an alternate path to ground when the relay 250 closes the make contacts 255. The buzzer circuit is held open when break contacts 257 open another portion of the buzzer circuit. Operation of relay 250 further closes the contacts 256 in its locking circuit which circuit includes the closed contacts 211 of the operated relay 210. Since relay 210 is under the control of the calling P. A. X subscriber as hereinafter to be explained, the operation of the relay 250 is therefore also controlled by that subscriber. The attendant, after hearing both parties conversing, returns the ANS Key 220 to normal and retires to other duties.

RELEASING

The automatic disconnect feature of present invention, effected only by a P. A. X subscriber, requires that all of the connectors used in conjunction with the P. A. X equipment be of the type designated as "Either party release with normals of attendant's station line reversed." When the P. A. X subscriber originally called the attendant's station 200 and the connector 101 switched through, the battery polarity on the attendant station line reversed and the relay 210 operated. Current of the opposite polarity, that is, the current flowing from the line equipment when the connector is released, does not affect relay 210 because rectifier 208 prevents the current from flowing in this opposite direction through the relay. Thus when the P. A. X subscriber terminates the call by replacing his handset the connector 101 releases relay 210. Relay 210 restores and opens the make contacts 211 which break the locking circuits to relays 240 and 250; make contacts 212 open the circuit to the buzzer 227; and make contacts 213 open the circuit to the P. A. X supervisory lamp 214 causing it to extinguish. Relay 250 restores and through its contacts performs the following operations: break contacts 251 close an incomplete circuit to relay 260; the make contacts 252 and 253 open up and disconnect the P. A. X lines 106 and 107 from the radio trunks 237 and 238, respectively; the make contacts 255 remove ground from the simplex leg of the repeating coil 265 causing relay 360 to restore thus shutting off the radio transmitter 330; and make contacts 256 open a locking circuit at one point to relay 250. Relay 280 is also restored when the make contacts 255 open up. Relay 240 restores and opens its lock circuit at one point when contacts 241 open up. Break contacts 242 close and prepare the buzzer circuit for the next incoming call. Relay 280 restores and through its make contacts 282 opens the circuit to the Radio supervisory lamp 283 causing it to extinguish.

*Calls from mobile radio to P. A. X*

When a mobile unit, for example 400, calls the attendant at the attendant station 200, ground is applied to the simplex leg of the trunk at the point 271 of the repeating coil 265 when the receiver squelch relay 350 operates and closes its make contacts 351. As a result, current flows from ground through the make contacts 351 of relay 350 to the center tap 307 of the repeating coil 301, through both windings 302 and 305, through both windings 267 and 269 of the repeating coil 265, out through the center tap 271, and through the winding on relay 280 to battery. Relay 280 operates causing the make contacts 281 to close a circuit to the buzzer 227 from ground through the make contacts 281 through the buzzer 227, through the break contacts 242 on relay 240, through the break contacts 263 on relay 260, and through the break contacts 257 on relay 250 to battery. The make contacts 351 also complete an operating circuit to relay 360 which in turn is effective to energize the radio transmitter 330 when the make contacts 361 close. Contacts 282 close a circuit to the Radio supervisory lamp 283 causing it to light to thereby signal the attendant. Hence the attendant is alerted both visually and audibly of an incoming call. The attendant responds by operating the ANS Key 220 to the Radio position. This results in the energization of relay 260 when the circuit is closed from ground through the make contacts 221 on the ANS Key 220, through the break contacts 236 of the Monitor-RLS Key 231, through the break contacts 251 on relay 250, and through the winding of relay 260 to battery. Contacts 222 and 225 connect the attendant's telephone at the operator's telephone circuit 230 to the radio trunk 237 and 238 through the lines 231′ and 232′, respectively. Make contacts 261 on the relay 260 close and connect ground to the simplex leg of the repeating coil 265 thereby establishing a lock circuit for relay 360 which in turn continues to keep the radio transmitter 330 operating. The radio transmitter 330 operating circuit is locked so that when the radio receiver 340 is no longer receiving a carrier wave signal from the calling mobile station as a result of which the radio squelch relay 350 is restored and ground is removed at make contacts 351, a new source of ground connection is available at the make contacts 261 on relay 260. A locking circuit is established for relay 260 when its contacts 262 close. Break contacts 263 open the circuit to the buzzer 227 thereby silencing it. The attendant, after acknowledging the call, is requested to call a subscriber on the P. A. X line. The attendant then operates the ANS Key 220 to the P. A. X position which results in the energization of relay 240 and connection of the operator's telephone circuit to the lines 106 and 107. Thereafter when the operator dials the desired P. A. X subscriber number, impulses are sent from the dial, across the connecting lines 231' and 232' through the make contacts 223 and 224, and over the lines 106 and 107, 108 and 109, and to the line circuit 103 and connector switch 102 in the P. A. X 100. Relay 240 operates when the make contacts 226 on the ANS Key 220 close. The make contacts 241 establish a lock circuit for relay 240 and the break contacts 242 open the buzzer circuit.

When the call is answered, the connector in use will switch through and furnish reverse battery to the lines 108 and 109, causing relay 210 to become energized. Relay 210 operates and through its make contacts 213 lights the P. A. X supervisory lamp 214. Make contacts 211 close and keep the relay 240 operated when the ANS Key 220 is restored to normal. The attendant by momentarily operating the Trunk Key 264, energizes relay 250. The attendant then restores the ANS Key 220 to normal. Relay 250 operates and opens the break contacts 251 thereby releasing relay 260. A talking circuit is established between the calling mobile subscriber and the called P. A. X subscriber when the make contacts 252 and 253 connect the radio trunk 237 and 238 to the line 106 and 107, respectively, through the condensers 228 and 229.

*Releasing*

The releasing operation is accomplished in a manner similar to that described for "P. A. X to mobile operation."

*Mobile to mobile operation*

When a mobile unit, for example 400, calls another mobile unit, for example 402, ground is placed on the simplex leg of the trunk 284 and 285 when radio squelch relay 350 operates upon the receipt of a carrier wave signal from a transmitter located at the calling radio mobile unit and closes its make contacts 351. The Radio supervisory lamp 283 lights up as a result of the operation of relay 280 and its make contacts 282. The make contacts 281 close a circuit to the buzzer 227 causing it to operate and summon the attendant. By operation of the ANS Key 220 to the Radio position the operator's telephone circuit 230 will be connected across the radio trunk and the attendant will hear the mobile unit 400 calling another mobile unit 402. The operator then operates the Monitor-RLS Key 231 to the Monitor position causing the P. A. X line to become busy to any incoming P. A. X calls. This is accomplished when the make contacts 232 on the Monitor-RLS Key 231 close and place a short across the lines 106 and 107. Operation of the ANS Key 220 to Radio position closes the make contacts 221 which cause relay 260 to operate. As a result, ground is placed on the simplex leg of the radio trunk 284 and 285. This ground completes an operating circuit to the radio transmitter relay 360 which in turn locks the transmitter in operating condition. As a result a radio channel by way of the above mentioned transmitter is made possible to all other mobile units. The attendant is able to monitor a call by means of the handset located at the operator's telephone circuit 230 or the loudspeaker 201.

*Releasing*

When the mobile units 400 and 402 sign off, the attendant operates the Monitor-RLS Key 231 to the Release position, thus releasing relay 260 when the break contacts 236 open up. Then when the Monitor-RLS Key 231 is returned to normal, the make contacts 232 open up and remove the short from the P. A. X line 106 and 107. Relay 260 restores and through its make contacts 261 removes the ground from the simplex leg of the repeating coil 265 which is instrumental in releasing relay 360 and in consequently shutting off the radio transmitter 330. This removal of ground also causes relay 280 to release, which results in the extinguishing of the Radio supervisory lamp 283 when the make contacts 282 open up.

While there has been described what is at present considered to be the preferred embodiment of the invention, it will be understood that various modifications may be made herein and it is intended to cover in the appended claims all such modifications as fall within the true spirit and scope of the invention.

What is claimed is:

1. In a radio telephone system, a telephone exchange having a plurality of subscriber stations connected thereto, a radio transmitter, and an attendant station comprising an operator's telephone circuit, a line for connecting said exchange to said attendant station, means in said exchange controlled by a calling one of said subscriber stations for connecting to and seizing said line, a radio trunk for connecting said radio transmitter to said attendant station, a first switching means, a first operation of said first switching means connecting said operator's telephone circuit to said line, a second operation of said first switching means energizing said radio transmitter and connecting said operator's telephone circuit to said radio trunk, a second switching means for connecting said line to said radio trunk, and means operated only in response to release of said line by said calling subscriber station for independently and simultaneously disconnecting said line from said radio trunk and de-energizing said transmitter.

2. In a radio telephone system, a telephone exchange having a plurality of subscriber stations connected thereto, a radio transmitter, and an attendant station comprising an operator's telephone circuit, a line for connecting said exchange to said attendant station, means in said exchange controlled by a calling one of said subscriber stations for connecting to and seizing said line, a radio trunk for connecting said radio transmitter to said attendant station, a first switching means, a first operation of said first switching means connecting said operator's telephone circuit to said line, a second operation of said first switching means energizing said radio transmitter and connecting said operator's telephone circuit to said radio trunk, a control relay, and a second switching means, operation of said second switching means connecting said line to said radio trunk and transferring control of said transmitter from said first switching means to said control relay, said control relay operated responsive to the release of said line by said calling subscriber to independently de-energized said transmitter.

3. In a radio telephone system as claimed in claim 2, said control relay operated responsive to the release of said line by said calling subscriber to independently disconnect said line from said radio trunk.

4. In a radio telephone system, a telephone exchange having a plurality of subscriber stations connected thereto, a radio transmitter, and an attendant station comprising an operator's telephone circuit, a line for connecting said exchange to said attendant station, means in said exchange controlled by a calling one of said subscriber stations for connecting to and seizing said line, a control relay operated responsive to seizure of said line by said calling subscriber station, a signaling circuit including signaling means, said signaling circuit controlled by said control relay to operate said signaling means when said line is seized by said calling subscriber station, a first switching means, a first operation of said first switching means connecting said operator's telephone circuit to said line and opening said signaling circuit, a second operation of said first switching means energizing said radio transmitter and connecting said operator's telephone circuit to said radio trunk, and a second switching means, operation of said second switching means connecting said line to said radio trunk and transferring control of said transmitter from said first switching means to said control relay and transferring the said connection of said line and said radio trunk from said second switching means to said control relay, said control relay operated in response to the release of said line by said calling subscriber station to independently and simultaneously de-energize said transmitter, disconnect said line from said radio trunk and prepare said signaling circuit for further incoming calls.

5. In a radio telephone system, a telephone exchange having a plurality of subscriber stations connected thereto, a radio transmitter, and an attendant station comprising a line for connecting said exchange to said attendant station, means in said exchange controlled by a calling one of said subscriber stations for connecting to and seizing said line, a control relay energized responsive to seizure of said line by said calling subscriber station, and de-energized responsive to the release of said line by said calling subscriber station, a first switching means, a first transmitter relay for controlling the energizing of said transmitter, said first transmitter relay operated responsive to the operation of said first switching means to energize said transmitter, a second switching means, and a second transmitter relay for controlling the energizing of said transmitter, said second transmitter relay energized responsive to the operation of said second switching means to transfer control of said transmitter to said second transmitter relay, said second transmitter relay de-energized responsive to the de-energizing of said control relay to thereby de-energize said transmitter.

6. A radio telephone system comprising a private automatic exchange having a plurality of subscriber stations connected thereto, a plurality of mobile radio subscriber stations, each of said mobile stations comprising a radio transmitter and receiver, said mobile transmitters transmitting over a first channel, and an attendant station comprising a radio transmitter and receiver, said attendant transmitter transmitting over a second channel, an operator's telephone circuit, a line connecting said automatic exchange to said attendant station, means in said exchange controlled by any one of said exchange subscriber stations for connecting to and seizing said line, a radio trunk connecting said attendant radio transmitter and receiver to said attendant station, a control relay energized responsive to seizure of said line, a signaling circuit including signaling means, said signaling circuit completed by the operation of said control relay to operate said signaling means, a first transmitter control circuit including a first transmitter relay, said control circuit partially completed by the operation of said control relay, a first switching means, a first operation of said first switching means connecting said operator's telephone circuit to said line and opening said signaling circuit, a second transmitter control circuit including a second transmitter relay, a second operation of said first switching means disconnecting said operator's telephone circuit from said line and connecting it to said radio trunk and operating said second transmitter relay, operation of said second transmitter relay completing said second transmitter control circuit to energize said attendant transmitter, said operator thereby enabled to communicate with said mobile subscribers over said second channel, and a second switching means, operation of said second switching means completing said first transmitter control circuit to thereby operate said first transmitter relay, operation of said first transmitter relay transferring control of the energization of said attendant transmitter from said second transmitter control circuit to said first transmitter control circuit, operation of said first transmitter relay further connecting said line to said radio trunk, release of said line by said calling exchange subscriber station de-energizing said control relay to thereby open said first transmitter control circuit thereby simultaneously and independently de-energizing said attendant transmitter and disconnecting said line from said radio trunk.

7. A radio telephone system as claimed in claim 6, said attendant station including a third transmitter relay operated responsive to signals received from any of said mobile radio subscriber stations by said attendant receiver over said first channel, said third transmitter relay operative to complete said signaling circuit and energize said attendant transmitter.

8. In a radio telephone system as claimed in claim 7, an impulse generating dial connected to said operator's telephone circuit, a third operation of said first switching means disconnecting said operator's telephone circuit from said radio trunk and re-connecting it to said line, and means operated in response to receipt of impulses corresponding to the dialed digits for connecting said line to a desired private automatic exchange susbcriber station.

9. A radio telephone system as claimed in claim 7, in which said signals received from any of said mobile radio subscriber stations by said attendant receiver over said first channel are re-transmitted by said attendant transmitter over said second channel to said other mobile radio subscriber stations.

10. A radio telephone system as claimed in claim 9, said attendant station including a third switching means, operation of said third switching means effective to busy said line connecting said automatic exchange to said attendant station to thereby apprise said exchange subscriber stations that said attendant radio transmitter and receiver are unavailable for use.

References Cited in the file of this patent

UNITED STATES PATENTS

| | | |
|---|---|---|
| 1,472,987 | Murphy | Nov. 6, 1923 |
| 1,504,204 | Andrick | Aug. 12, 1924 |
| 2,523,914 | Molnar | Sept. 26, 1950 |
| 2,575,782 | Bartelink | Nov. 20, 1951 |